2,824,124
PROCESS OF OXIDATIVELY POLYMERIZING ETHYLENE IN THE PRESENCE OF METHYL FORMATE

Nat C. Robertson, Wellesley, Charles I. Tewksbury, Chestnut Hill, and Albert Di Nardo, Jamaica Plain, Mass., assignors, by mesne assignments, to Escambia Chemical Corporation, Pace, Fla., a corporation of Delaware No Drawing. Application December 29, 1955
Serial No. 556,057

9 Claims. (Cl. 260—497)

This invention relates to the production of chemicals and in particular to the production of novel polymers of ethylene.

A principal object of the present invention is to provide a process for producing good yields of oxygenated polymeric materials by the oxidation of ethylene in the presence of methyl formate.

Still another object of the present invention is to produce novel polymeric materials and derivatives thereof.

Other objects of the invention will in part be obvious and will in part appear hereinafter.

The invention accordingly comprises the process involving the several steps and the relation and the order of one or more of such steps with respect to each of the others and the product possessing the features, properties and relation of components which are exemplified in the following detailed disclosure, and the scope of the application of which will be indicated in the claims.

For a fuller understanding of the nature and objects of the invention, reference should be had to the following detailed description.

The present invention is directed to the manufacture of valuable polymeric materials by the oxidation of ethylene. The polymeric materials are preferably obtained by oxidizing and polymerizing ethylene in the presence of methyl formate at ethylene partial pressures above 500 p. s. i. and at temperatures on the order of about 170° C. and above. This oxidative polymerization may be carried out either in the presence or absence of suitable organic solvents.

It has been found that when the oxidative polymerization of ethylene is carried out in the presence of appreciable quantities of methyl formate, the polymeric material obtained contains large quantities of ester groups. A large percentage of the ester groups present are carboxymethyl groups (—COOCH$_3$) presumably derived from the methyl formate.

The polymeric material, as obtained from the above reaction, comprises compounds containing from 2 to 60 or more ethylene residues per molecule. These molecules, in addition to ester groups, may contain double bonds, carboxy groups, carbonyl groups, alkoxy groups and hydroxy groups (primary and secondary). The polymer contains, on the average, at least one oxygenated functional group per molecule and an appreciable proportion of the molecules present may be difunctional. The quantity of oxygen present in the polymer lies between about 5 and 25 percent. The average molecular weight of the polymeric material has been found to be consistently above about 200.

The raw polymeric material may be subjected to a wide range of subsequent modification treatments with or without preliminary partial separation of its constituents. Among these further modification treatments for the production of alcohols, acids and the like are reduction or hydrogenation, oxidation, hydrogenolysis, acetylation, hydrolysis or combinations of these reactions. In some cases, it may be desirable that the carbon-to-carbon double bonds present in the polymeric material be saturated with hydrogen prior to any extensive modification of the polymer.

The polymers produced by the present invention, and particularly their alcohol and acid derivatives, have considerable utility. They may be used as components of synthetic lubricants, viscosity index improvers and pour point depressants for petroleum lubricants. Accordingly, fairly wide ranges of molecular structures and molecular weights may be utilized. The same is often generally true of the use of these materials as plasticizers. The polymeric acids and alcohols may also be more closely fractionated to provide valuable chemical intermediates for the manufacture of resins such as polyesters and the like. Equally, these materials may be converted to synthetic detergents, emulsifiers, wetting agents and surface active materials in general.

Specific detailed methods of practicing the present invention are set forth in the following non-limiting examples.

Example I

The organic solvent, 500 cc. of benzene, 1.4 grams of manganese propionate catalyst and 250 cc. of methyl formate, were charged to a high pressure reactor with a volume of about 0.1 cubic foot. The reactor was sealed and put under about 600 p. s. i. of nitrogen and brought up to the operating temperature of about 220° C. Ethylene was charged to the reactor to bring the pressure up to about 2000 p. s. i. and the pressure relief valve was adjusted to maintain this pressure. Ethylene was fed to the reactor at a rate of about 40 standard cubic feet per hour per cubic foot of reactor along with a steady rate of air feed, also of about 40 standard cubic feet per hour per cubic foot of reactor. The ethylene feed rate was such that the ethylene partial pressure was maintained on the order of about 1000 p. s. i. throughout the reaction. After two hours, the run was terminated and the polymeric materials formed were recovered from the benzene solvent. The above run produced about 60.6 grams of polymeric oxygenated material per standard cubic foot of oxygen fed. This polymeric material had an average molecular weight on the order of about 518 and contained about 12 percent oxygen. This polymeric material was found to have a functionality of $1.2 \times 10^{-3}$ equivalents per gram of carbonyl, $2.5 \times 10^{-3}$ equivalents per gram of ester, $0.5 \times 10^{-3}$ equivalents per gram of methoxy, and $0.4 \times 10^{-3}$ equivalents per gram of acid.

Example II

A similar oxidative polymerization of ethylene was carried out under essentially the same conditions (of temperature, ethylene partial pressure, solvents, ethylene and air feed rates, etc.) as were present in Example I, except that no methyl formate was present during the run. The polymeric material obtained from this run had an average molecular weight on the order of about 513 and contained about 12 percent oxygen. This polymeric material was found to have a functionality of $1.5 \times 10^{-3}$ equivalents per gram of carbonyl, $1.1 \times 10^{-3}$ equivalents per gram of ester, $0.1 \times 10^{-3}$ equivalents per gram of methoxy, and $0.5 \times 10^{-3}$ equivalents per gram of acid.

Example III

A similar oxidative polymerization of ethylene was carried out under essentially the same conditions (of temperature, ethylene partial pressure, ethylene and air feed rates, etc.) as were present in Example I, except that the benzene solvent was omitted and the liquid medium consisted of 750 cc. of methyl formate. This run produced about 79 grams of polymeric oxygenated material per standard cubic foot of oxygen fed. This polymeric material had an average molecular weight on the order of about 330 and contained about 13 percent oxygen. This polymeric material was found to have a functionality of $1.4 \times 10^{-3}$ equivalents per gram of carbonyl, $1.7 \times 10^{-3}$ equivalents per gram of ester, $0.6 \times 10^{-3}$ equivalents per gram of methoxy, and $0.5 \times 10^{-3}$ equivalents per gram of acid.

Comparison of the polymeric materials shows that the quantity of ester groups in Examples I and III were substantially greater than that obtained in Example II, which employed no methyl formate. Likewise, the quantity of methoxy groups obtained in Examples I and III was at least four times greater than that present in the polymeric material obtained in Example II.

While several limited examples of the present invention have been described above, it should be pointed out that numerous modifications may be made without departing from the scope of the invention. The oxidative polymerization of ethylene in the presence of methyl formate produces a polymeric material in which there is incorporated a substantial number of carboxymethyl groups derived from the methyl formate. The quantity of methyl formate present during the oxidative polymerization of ethylene may be varied considerably, as shown by the examples. The quantity of methyl formate employed depends to a great extent upon the amount of carboxymethyl group incorporation desired. However, it is preferable that there be employed a quantity of methyl formate such that there can be at least one carboxymethyl group incorporated in each molecule of polymer ultimately formed. The desired quantities of methyl formate may be used in the presence of an inert organic solvent, such as illustrated in Example I, or used in such quantities as to be the sole initial liquid medium in the reactor, as illustrated in Example III.

As illustrated in the examples, the oxidative polymerization may be carried out either in the presence or absence of suitable organic solvents. When organic solvents are employed, it is preferred that the solvent be relatively inert to methyl formate and oxygen at the reaction temperature and that it not be consumed during the reaction. Numerous solvents other than the preferred benzene can be employed in the reaction. For example, diphenyl, paraffin hydrocarbons not containing a tertiary carbon and the like may also be used as appropriate solvents. As pointed out above, methyl formate alone may be employed as the solvent.

With regard to the pressure, it should be pointed out that it is maintained at ethylene partial pressures above 500 p. s. i. and preferably between about 500 and 5000 p. s. i. Ethylene is thus introduced or fed to the reactor at a rate such as to maintain the desired ethylene partial pressure within the reactor relatively constant throughout the reaction. It is evident that this rate, which may vary somewhat during the reaction, will be such as to make up for the loss of ethylene in the purge gas and for that which has reacted.

The elemental oxygen employed for the reaction is considered, as is the methyl formate, an essential reactant to the production of polymeric materials containing between 5 and 25 percent oxygen and not as a mere catalyst. The quantity of elemental oxygen, as also the ethylene desired to be introduced into the reactor, is expressed in terms of a unit rate of feed per unit of time per unit of reactor volume. The elemental oxygen is thus preferably continuously introduced or fed to the reactor at a rate at least one standard cubic foot per hour per cubic foot of reactor. Rates of between about 1 and about 25 standard cubic feet per hour of elemental oxygen per cubic foot of reactor are most suitable for the reaction. The temperature within the reactor may be varied between about 170° C. and 250° C. or higher.

Since prolonged effective reaction times or polymer residence times greatly modify the functionality of the polymeric material, it is desirable to control the oxidative polymerization of ethylene in the presence of methyl formate such that the recovered polymer contains between about 5 and 25 percent oxygen. By thus controlling the oxidative polymerization, it is possible to produce good yields of oxygenated ethylene polymers containing large quantities of ester groups, a good percentage of which are carboxymethyl groups. These polymers are quite uniform in the character of the oxygenated functional groups present and are quite readily reproducible.

Since certain changes may be made in the above process and product without departing from the scope of the invention herein involved, it is intended that all matter contained in the above description shall be interpreted as illustrative and not in a limiting sense.

What is claimed is:

1. In the non-catalytic production of oxygenated polymeric materials of ethylene containing a substantial quantity of ester groups, the process which comprises reacting in a reactor ethylene and elemental oxygen in the presence of a substantial quantity of methyl formate at a temperature above about 170° C., introducing ethylene into the reactor at a rate to maintain therein ethylene partial pressures between about 500 to 5000 p. s. i., continuously introducing elemental oxygen at a rate of at least one standard cubic foot per hour per cubic foot of reactor, continuing the oxidative polymerization until oxygenated polymeric materials of ethylene with an average molecular weight above 200 and containing a substantial quantity of ester groups are obtained, and recovering said polymeric materials.

2. In the non-catalytic production of oxygenated polymeric materials of ethylene containing a substantial quantity of ester groups, the process which comprises reacting in a reactor ethylene and elemental oxygen in the presence of methyl formate at a temperature above about 170° C., there being present during the reaction a quantity of methyl formate such that there can be at least one carboxymethyl group incorporated in each molecule of polymeric material formed, introducing ethylene into the reactor at a rate to maintain therein ethylene partial pressures between about 500 and 5000 p. s. i., continuously introducing elemental oxygen at a rate of at least one standard cubic foot per hour per cubic foot of reactor, continuing the oxidative polymerization until oxygenated polymeric materials of ethylene with an average molecular weight above 200 and containing a substantial quantity of ester groups are obtained, and recovering said polymeric materials.

3. The process of claim 2 wherein said reaction is carried out in an organic solvent.

4. The process of claim 3 wherein said organic solvent is benzene.

5. In the non-catalytic production of oxygenated polymeric materials of ethylene containing a substantial quantity of ester groups, the process which comprises reacting in a reactor ethylene and element oxygen in the presence of methyl formate at a temperature above about 170° C., there being present during the reaction a quantity of methyl formate such that there can be at least on carboxymethyl group incorporated in each molecule of polymeric material formed, introducing ethylene into the reactor at a rate to maintain therein ethylene partial pressures of between about 500 and 5000 p. s. i., continuously introducing elemental oxygen at a rate of between about one and twenty five standard cubic feet per hour per cubic foot of reactor, continuing the oxidative polymerization until oxygenated polymeric materials of ethylene with an average molecular weight above 200 and containing a substantial quantity of ester groups are obtained, and recovering said polymeric materials.

6. The process of claim 5 wherein said reaction is carried out in an organic solvent.

7. The process of claim 6 wherein said organic solvent is benzene.

8. In the non-catalytic production of oxygenated polymeric materials of ethylene containing a substantial quantity of ester groups, the process which comprises reacting in a reactor ethylene and elemental oxygen in the presence of methyl formate at a temperature above about 170° C., there being present during the reaction a quantity of methyl formate such that there can be at least one carboxymethyl group incorporated in each molecule of polymeric material formed, introducing ethylene into the reactor at a rate to maintain therein ethylene partial pressures on the order of about 2000 p. s. i., continuously introducing elemental oxygen at a rate of between about one and twenty-five standard cubic feet per hour per cubic foot of reactor, continuing the oxidative polymerization until oxygenated polymeric materials of ethylene with an average molecular weight above 200 and continuing a substantial quantity of ester groups are obtained, and recovering said polymeric materials.

9. In the non-catalytic production of oxygenated polymeric materials of ethylene containing a substantial quantity of ester groups, the process which comprises reacting in a reactor ethylene and elemental oxygen in the presence of methyl formate at a temperature above about 170° C., there being present during the reaction a quantity of methyl formate such that there can be at least one carboxymethyl group incorporated in each molecule of polymeric material formed, introducing ethylene into the reactor at a rate to maintain therein ethylene partial pressures on the order of about 2000 p. s. i., continuously introducing elemental oxygen at a rate of about eight standard cubic feet per hour per cubic foot of reactor, continuing the oxidative polymerization until oxygenated polymeric materials of ethylene with an average molecular weight above 200 and containing a substantial quantity of ester groups are obtained, and recovering said polymeric materials.

References Cited in the file of this patent

UNITED STATES PATENTS

| | | |
|---|---|---|
| 2,402,137 | Hanford et al. | June 18, 1946 |
| 2,519,754 | Gresham et al. | Aug. 22, 1950 |
| 2,701,813 | Snyder | Feb. 8, 1955 |